United States Patent [19]

Sehloemer

[11] Patent Number: 5,566,354
[45] Date of Patent: Oct. 15, 1996

[54] SYSTEM AND METHOD FOR CHANNEL ASSIGNMENT IN A SATELLITE TELEPHONE SYSTEM

[76] Inventor: Jerry R. Sehloemer, 401 Lake St., Edwards Subdivision, Round Lake, Ill. 60073

[21] Appl. No.: 312,271

[22] Filed: Sep. 26, 1994

[51] Int. Cl.⁶ .................................................. H04B 7/185
[52] U.S. Cl. .................. 455/12.1; 455/13.1; 455/33.1; 455/56.1
[58] Field of Search .................... 455/12.1, 13.1, 455/13.2, 33.1, 54.1, 56.1, 62, 63, 67.1, 98; 342/352, 418; 379/59

[56] References Cited

U.S. PATENT DOCUMENTS

| | | | |
|---|---|---|---|
| 4,001,690 | 1/1977 | Mark et al. | 455/13.2 |
| 4,736,453 | 4/1988 | Schloemer | 455/62 |
| 5,093,924 | 3/1992 | Toshiyuki et al. | 455/62 |
| 5,119,225 | 6/1992 | Grant et al. | 455/12.1 |
| 5,119,504 | 6/1992 | Durboraw, III | 455/13.2 |
| 5,148,548 | 9/1992 | Meche et al. | 455/62 |
| 5,216,427 | 6/1993 | Yan et al. | 342/352 |
| 5,390,348 | 2/1995 | Magin et al. | 455/63 |
| 5,396,649 | 3/1995 | Hamabe | 455/54.1 |
| 5,404,568 | 4/1995 | Yamagishi | 455/12.1 |
| 5,410,728 | 4/1995 | Bertiger et al. | 455/56.1 |

Primary Examiner—Reinhard J. Eisenzopf
Assistant Examiner—Marsha D. Banks-Harold
Attorney, Agent, or Firm—Leo J. Aubel

[57] ABSTRACT

A system and method for making channel assignments in a low earth orbit satellite telephone system wherein Doppler effect is utilized as a parameter in channel assignment. In a first embodiment the satellites orbit in a fixed grid pattern, and in a second embodiment the satellites move in orbits that appear random relative to each other.

5 Claims, 12 Drawing Sheets

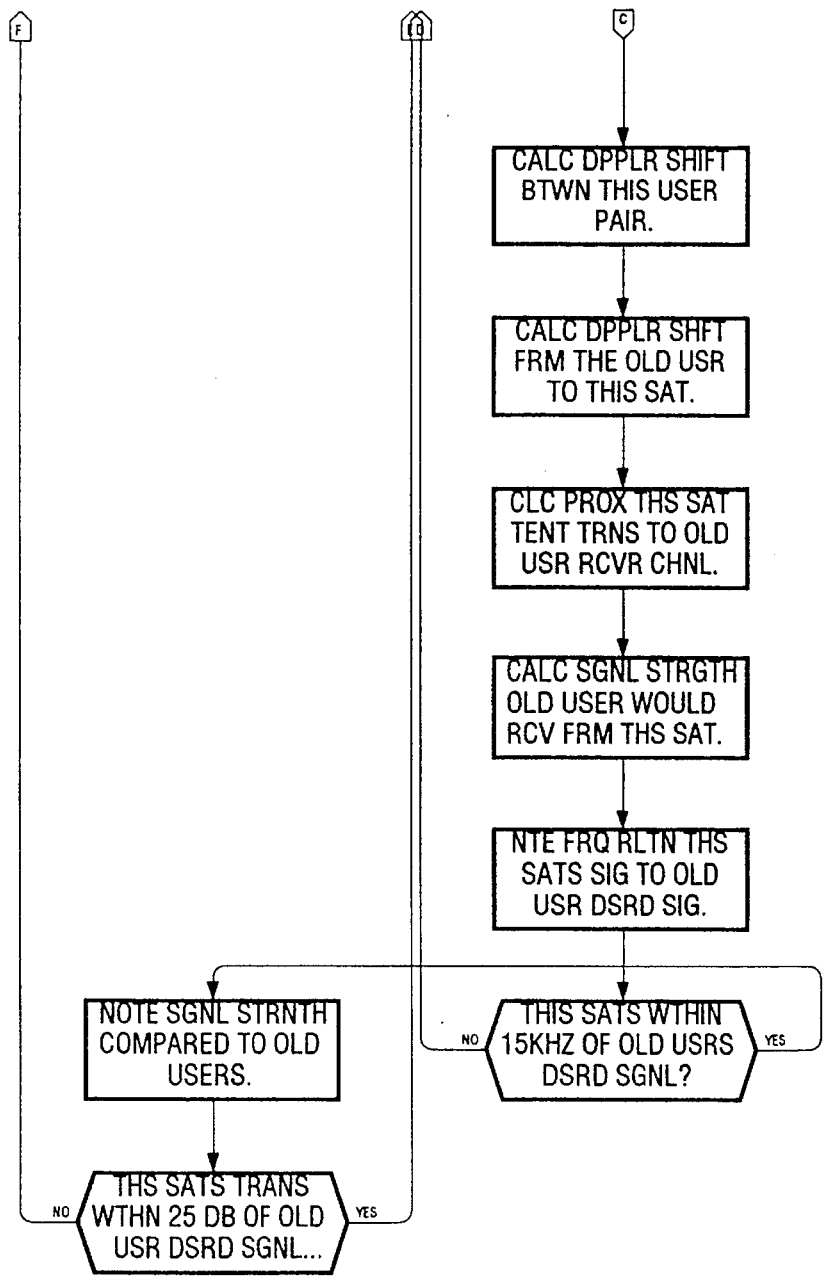

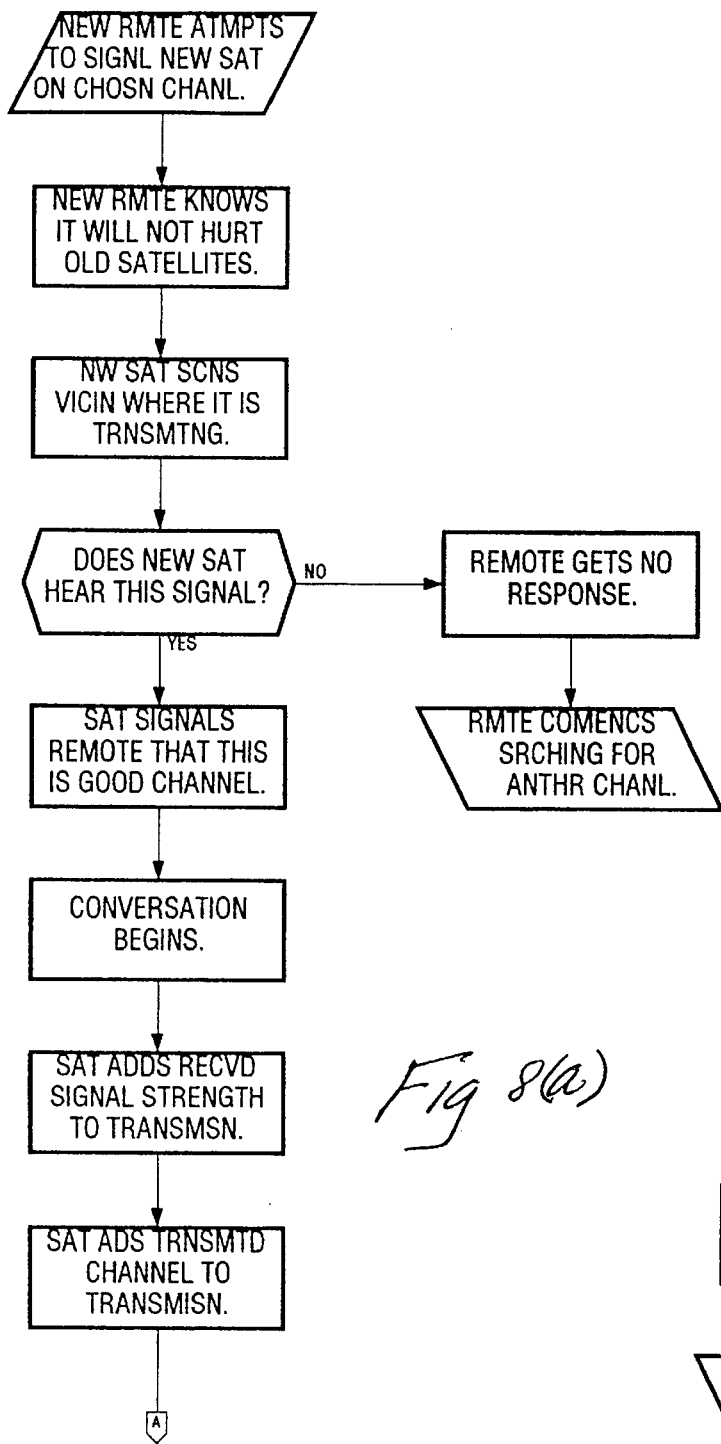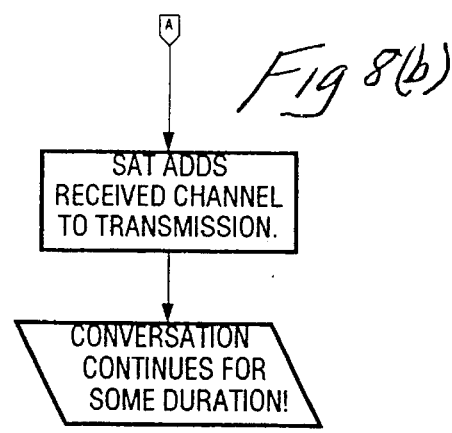

SYSTEM AND METHOD FOR CHANNEL ASSIGNMENT IN A SATELLITE TELEPHONE SYSTEM

BACKGROUND OF THE INVENTION

The explosive growth of cellular radio during the late 1980s and early 1990s highlighted the importance of mobile telephone communications. Almost all large world wide cities in the developed world now enjoy some form of cellular communications. However, there are still some areas that are not served by cellular. In some developing nations there is not enough of a demand to install wide area cellular systems. In developed nations, there are still remote areas that have not yet been covered by the cellular system.

One approach that has enjoyed considerable press is the idea of creating a satellite system that would provide telephone service the world over. The argument for such an approach is that it would provide coverage to developing countries, and also provide coverage in remote areas in developed countries. (In addition many land line phone companies have less than stellar reputations in some countries, and it is assumed that many citizens would also use a newer and more reliable service.)

In addition, the cost of cellular radio is quite high, and there is a good possibility that satellite systems would yield a lower cost to the final user. Some of this cost savings will be from a simplified business structure. Today, a cellular user might begin his call with a local cellular operator that switches his call to the local bell telephone company that further processes and switches his call. Perhaps a single satellite system could route calls to the final user with fewer different business involvements that would lead to a lower cost.

The physics of satellite orbits, and the physics of radio propagation are very important in the design of a satellite radio telephone system. Radio propagation is such that the available higher frequencies for such a system will not bend around the curvature of the earth, and that such systems will be generally limited to line of sight communications.

The first approach that would normally be considered is to place a geostationary satellite in orbit high above the earth. The first satellite radio links between the U.S.A. and Europe used this approach. There are several weaknesses to this approach:

1) The very high altitude of geostationary satellites causes limited frequency reuse in the system. Since spectrum is a valuable resource, such high altitude satellites are very spectrally inefficient in that the channels could only be used once in a very large area.

2) The very high altitude of geostationary satellites implies that there is a considerable distance between the phone user and his satellite. This large distance requires large transmitter power and/or a large antenna system at both ends of the communication link. These two limitations are especially difficult for the roaming mobile telephone user.

A second more practical approach is to place a pattern of orbiting satellites into lower earth orbits. These multiple satellites would permit some frequency reuse, and these lower altitude satellites would be closer to the earth surface, and thus smaller antennas and less power would be required. This approach of low earth orbit satellites has received considerable press, and they are frequently referred to as LEOS.

Several consortiums of large companies have proposed various approaches built around LEOS. The strategy would be to use the cellular radio concept of not using the same channel on adjacent satellites, and yet to create a grid of orbits such that coverage of the earth would be guaranteed. One proposed grid, however, would have orbits that rotate equally north and south of the equator and thus avoid the poles and simultaneously enhance coverage in the regions where the people reside. The Motorola Iridium concept, however, has orbits that rotate in a longitudinal manner around the earth.

U.S. Pat. No. 5,274,840 issued to Motorola shows a grid of 48 different satellites in 6 different planes. There are 8 satellites in each plane. The planes all intersect near the axis of rotation of the earth. All 48 satellites orbit over both poles. U.S. Pat. No. 5,161,248 issued to Motorola shows a grid of 77 satellites in similar polar orbits. However, in this system there are 7 planes with 11 satellites in each plane.

U.S. Pat. No. 5,119,504 issued to Motorola explains an anticipated handoff system. Since the satellites know where they are located, and the satellites also know the location of the earth user, they can calculate based on knowledge of their own orbits when handoffs are required.

Although these approaches are technically sound, the cost to create one of these systems is estimated to be near four billion dollars. In fact one recent announcement was budgeted at about 8 billion dollars. Some of the various factors that are contributing to the cost of such as system are as follows:

P1 Approximately 80 satellites are utilized in the present system. Each of these satellites weighs approximately 1,500 pounds. This results in a very expensive satellite, and also in a very expensive rocket launch cost. A total of 105,000 pounds of very high technology equipment has to be put into orbit.

In addition to the expensive and heavy satellites there is a very expensive satellite orbit control system to keep the satellites in their proper orbits. Each satellite needs various rockets, rocket fuel, and orbit control computer/radio technology to keep the satellite in a proper orbit. In case one of the satellites would accidentally end up in an improper orbit, there is a very comprehensive ground computer control system to insure that all the satellites stay in correct orbits, and to disable a satellite when it is not in the proper grid orbit. In addition, the complete failure of any one satellite would require the moving of a back up unit to take its place in the grid.

SUMMARY OF THE INVENTION

This invention provides a new approach to channel assignment in a LEOS system by using signal strengths adjusted by Doppler effects to calculate assignments based on actual signal strengths without relying on satellite position. This approach provides both the satellites and the earth user with a better signal.

DESCRIPTION OF DRAWINGS

The foregoing features and advantages of the present invention will be apparent from the following more particular description of the invention. The accompanying drawings, listed hereinbelow, are useful in explaining the invention.

FIGS. 5(a), 5(b), and 5(c) show a flow diagram that explains a procedure to determine if a satellite can choose a channel for initial broadcast:

FIGS. 8(a) and 8(b) show a flow diagram that explains a procedure to determine if the new satellite will hear a good signal from the new remote:

DETAILED DESCRIPTION OF THE INVENTION

Figure 1:
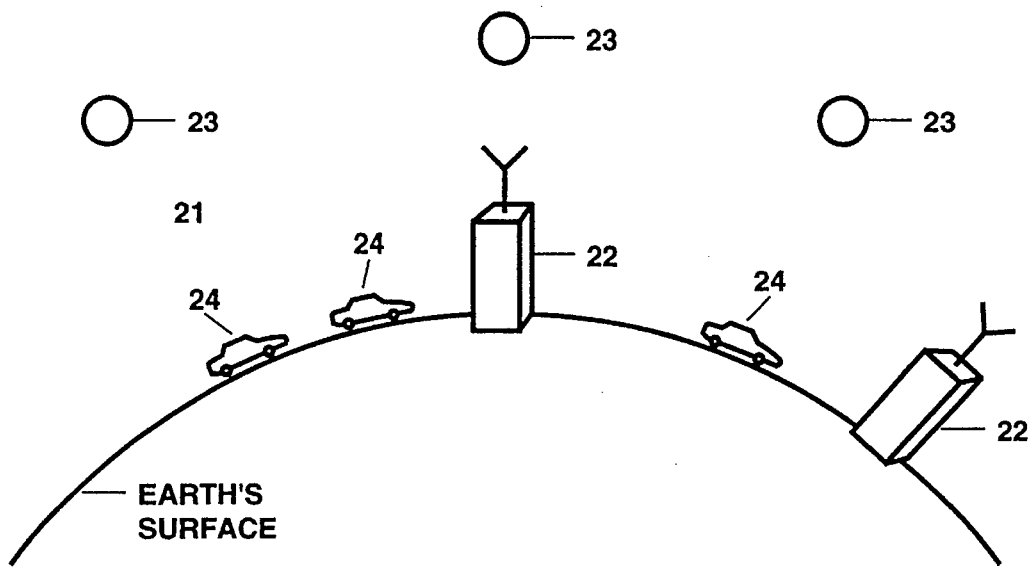
FIG. 1 is a diagram showing remotes, base sites, and satellites.

Referring first to FIG. 1, the present inventive satellite system 21 comprises base sites 22 that connect into the land line telephone network as is well known, a number of earth orbiting satellites 23, and multiple users 24. Users may be in vehicles, may be in buildings, or may be carrying portable handheld units: these user units are herein referred to as remotes or mobiles.

Figure 2:
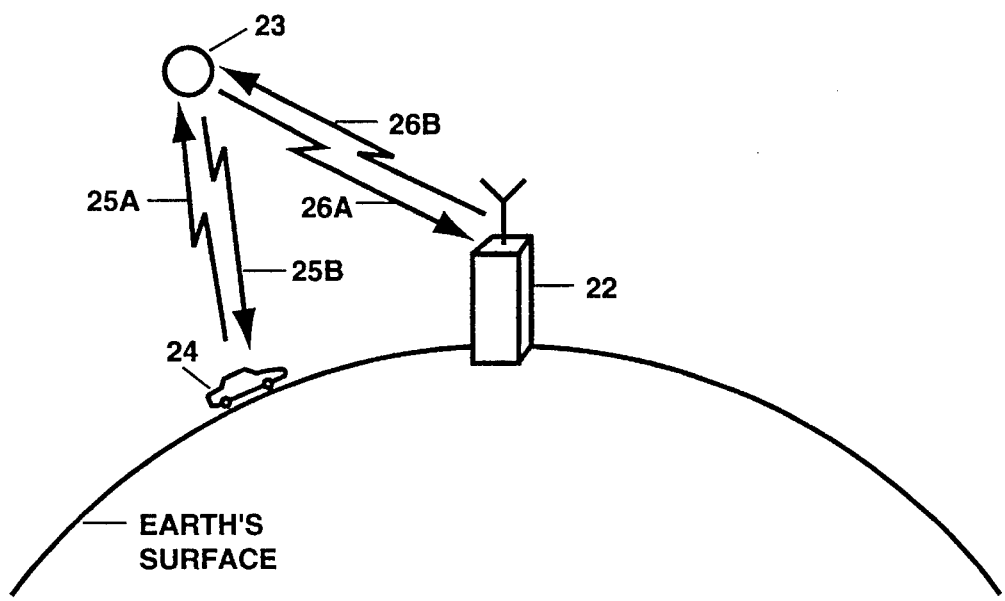
FIG. 2 is a diagram showing the signal paths that comprise a conversation between a remote and a base site using a satellite.

Referring to FIG. 2, the present inventive satellite system is a full duplex system in that each mobile unit 24 uses a pair of channels 25a and 25b to communicate with the satellite. The satellite uses a pair of channels 26a and 26b to communicate with the base station 22.

There are several different choices for frequencies for a satellite system. Low frequencies tend to bend around obstacles and provide very good service. On the other hand, higher frequencies are very subject to shadow effects and do not yield good signals to a receiver. At very high frequencies such as 10,000 megahertz to 20,000 megahertz, spectrum capacity is not an important issue because of the large bandwidths available. However, at these high frequencies the reception will be severely limited by trees, clouds, and building shadows.

At frequencies around 1,800 megahertz radio reception will be satisfactory. Therefore, the present system utilizes frequencies in the 1,800 megahertz band.

Potential users of the satellite system will be in cars with steel roofs and in homes with wood and conventional shingle roofs. Other users will be in commercial buildings with reinforced steel roofs. Other users will be shielded from line of sight to their satellites by foliage. It is difficult to express numerically the amount that such obstacles will reduce received power. However, the power transmitted must be sufficient to overcome these obstacles. The lower the frequency, the better will be the resulting service. Consequently, a band of frequencies near 1,800 megahertz is effective.

The mobile units in the present system transmit at 400 milliwatts, and the satellites transmit at 400 milliwatts. The earth stations, which are stationary, and do not have battery constraints transmit at 10 watts.

The satellite system utilizes a band of 42 megahertz. 10 megahertz are used for talking from the satellites to mobile units, and 10 megahertz are used for talking to the satellites from mobile units. Another 10 megahertz is used for the satellites to talk to the land line network, and another 10 megahertz is used for the land line network to talk up to the satellites. A channel spacing of 15 kilocycles is used. As shown in FIG. 2, two different links are required to make a phone call. The satellite user 24 uses a duplex pair of channels 25a and 25b to talk up to the satellites, and the satellite 23 uses another pair of duplex channels 26a and 26b to return the conversation to the base station 22 on earth. Therefore, a complete communication between the mobile and the satellite requires four different links. These links require four bands each of 10 megahertz for a total band of 40 megahertz.

The following are the operating system parameters:

| | |
|---|---|
| Number of Satellites in Orbit | 80 Units |
| Typical Height of a Satellite | 500 Miles |
| Number of Base Sites | 1 Minimum |
| Operating Frequency of System | 1,800 Megahertz |
| Spectrum set aside for total system: | 42 Megahertz |
| Spectrum for up link from the remote | 10 Megahertz |
| Spect. for down link from satellite to remote | 10 Megahertz |
| Spect. for up link from land line network | 10 Megahertz |
| Spect. for down link from satellite to land | 10 Megahertz |
| Spectrum for paging satellite to satellite | 1 Megahertz |
| Spectrum for paging satellite to ground | 1 Megahertz |
| Channel spacing | 15 Kilocycles |
| Guard Bands at end of each block | 50 Kilocycles |
| Number duplex channel pairs in the system for satellite to remote: (650 channels talk up, 650 channels down) | 650 |
| Number of duplex channel pairs in the system for satellite to land line (650 channels talk up, 650 channels down) | 650 |
| Duplex channel pairs required to per call | 2 |
| Number of Satellites in initial launch | 80 |
| Number duplex pairs per satellite (mobiles) | 40 |
| Number duplex pairs per satellite (landline) | 40 |
| Times a channel typically is reused | 5 |
| Paging channels (single) | 40 |

Since it takes two duplex sets to support a telephone call, each satellite supports up to 40 simultaneous phone calls. Broad band amplifiers are currently in development that will increase the 40 conversation capacity of each satellite. As explained in U.S. Pat. No. 4,965,850 issued to the inventor hereof, frequency reuse can be increased by a factor of three by selected various combinations of sites and mobiles.

The call handling capacity of the satellite system is limited. The fact that satellites require two sets of channels detracts from their potential capacity. Also in comparison, in land based cellular, most systems are designed that a channel may be reused up to five or ten times in a single metropolitan area. For example, in Chicago metropolitan area one might be able to reuse a channel up to five to ten different times. The limited antenna heights, and the tightly designed cellular patterns are created such that a channel intentionally can be reused many times. In addition, the same channels being used Chicago are used in Milwaukee and even in Springfield and St. Louis. Consequently, in a typical land based cellular system channels might be reused up to 20 or 40 or more times in a radius of 300 miles.

However, in a satellite system frequency reuse is limited, and consequently, a channel can be used only once in a very large area. Therefore, from the outset it must be understood that satellite systems are generally not an effective use of the radio spectrum.

Call Set Up and Handoff Procedure

In land based cellular systems the cell sites are laid out such that adjacent sites can not use the same channels. In this simple manner, adjacent channel interference is eliminated. However, by permitting distantly located sites to use the same channel, frequency reuse is permitted and spectrum capacity is enhanced.

In satellite systems where the satellites orbit in a grid or pattern, adjacent satellites are not permitted to use the same channel. Call set up operates in a manner similar to the land based system. Users search for a strong signal, and end up communicating with the satellite closest to them. The fact that certain satellites communicate only on certain channels guarantees that simultaneous channel usage on adjacent satellites will not occur.

Figure 11:
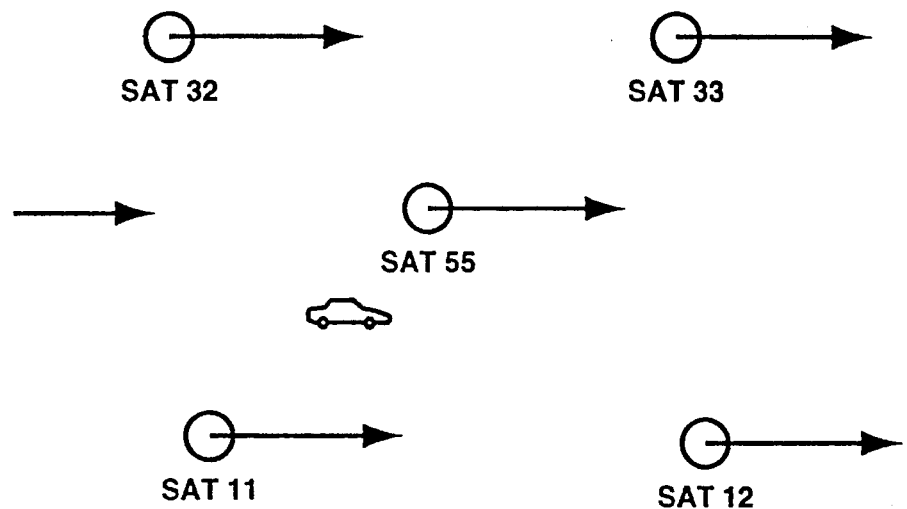
FIG. 11 is a sketch that shows a typical grid pattern of satellites over a mobile user.

Referring to FIG. 11, this diagram shows part of a grid of satellites in orbit, and shows that the few satellites above a given earth location will be in a pattern.

It has been found that assignments based on signal strengths in land based systems with a grid of base sites approximately triples the number of potential conversations. This technology has been disclosed and claimed in U.S. Pat. No. 4,965,850 cited above.

We have found that certain related signal strength technology is applicable to the present satellite system. Adding signal strength assignment improves the system and will not significantly change the cost to design, build, and launch the satellite system. Signal strength assignment in satellite systems will approximately triple the call handling capacity of the inventive system.

The following procedure is used for call set up. Refer to U.S. Pat. No. 4,965,850 which is hereby incorporated by reference. U.S. Pat. No. 4,965,850 explains various concepts that are useful in the understanding of this invention such as signal to noise, FM capture, and frequency reuse. The modulation method of the satellite system is narrow band frequency modulation: this modulation method supports both voice and data communication. With voice conversations TDMA (Time Division Multiple Access) is used. Because of the natural pauses in voice communications and the low information content of voice, it has been found that voice can be chopped up into smaller time segments, and that several of these conversations can be placed on a single radio channel. As stated above, in the present system channels are only used in pairs. For each satellite transmitter channel for transmitting to a remote, there is a corresponding channel for transmitting from the remote back to the satellite. The satellite to earth station channels are also used in pairs. Instead of referring to channels by their actual frequency, channel pairs will be referred to as 1, 2, . . . 650 for the satellite to remote group, and 1, 2, . . . 650 for the satellite to land line network or earth station. For each channel the group designation will be given. Each group has 650 channels as shown in the table above.

Only the mobile (remote) users can initiate calls. Land line users desiring to call a mobile (remote) user will page the user, and let the mobile (remote) user set up the call.

The paging process is limited to situations where the calling party knows the approximate location of the desired mobile user. The initiating caller will phone the land base nearest the assumed location of the mobile user, and that land base will use the satellites in the vicinity as transponders to copy the land base initiated page. The land base sends the page signal to all the satellites in the vicinity, and they merely copy, transpond, the page.

The transmitters of the remotes, bases, and satellites can only transmit on the given channels, and can not be tuned to transmit in the continuum between the channels. These frequencies are designated as channel 1, Channel 2, etc. As will be explained herein after, the receivers of the bases, remotes, and satellites will track the signals, and will consequently receive signals on the channels, and also in the continuum between the designated channels as will be explained hereinbelow.

It is known that sound from a source which is moving towards the listener will arrive at a higher frequency than was transmitted; and, that sound from a source that is moving away from the listener will arrived at a lower frequency than was transmitted. This phenomenon is known as a Doppler Shift.

In radio systems, electronic waves travel at the speed of light. Consequently, the Doppler problem is only of concern in radio systems where the velocities involved are very high. The frequency shift caused by Doppler in a radio system can be calculated by multiplying the transmitted frequency by the ratio of the relative velocity divided by the speed of light. It is interesting to note that the Doppler problem becomes more severe at higher frequencies. Because the Doppler shift in any low earth orbit satellite system will cause special design considerations in the receivers, this could be called the Doppler problem. However, in the invention disclosed herein the Doppler problem is converted to a "Doppler Opportunity".

Because of the high speed of the satellites there is a Doppler shift in the received frequencies. Because the relative speed of the satellites with respect to a given point on earth is also changing, the magnitude of this Doppler shift is also changing. Because of the continuously changing received frequencies in the system that are always gradually changing due to different relative velocities between the given point on earth and satellite, the receivers in the system will track the actual frequency being received. The center frequency of the input band of the receiver will stay tuned to the center frequency of the received signal. For example, a conversation might begin with a receiver listening on channel 8, and at the close of the conversation, the receiver could be listening on channel 9. In the interim, the receiver could be listening half way between the center of channel 8 and the center of channel 9. For explanation purposes, this half way position will be referred to as channel 8.5. During the tracking process the center of the receiver band will move continuously from 8.1 to 8.2 . . . to 8.9.

Because of a Doppler shift in the system that is based on the relative speed of the satellite to the earth located remote or the relative speed of the satellite to the earth located land line network base, the actual frequencies being transmitted, and the actual frequencies being received can vary as much as three channels. In the system described at a frequency band of 1800 megahertz, this Doppler shift corresponds to 45 KC. This 45 KC corresponds to three channels. If the satellite is moving directly toward an earth receiver, the frequency received will be increased as much as three 15 KC channels. If the satellite is moving directly away from an earth receiver, the frequency received will be decreased as much as three channels. If the satellite is moving exactly perpendicular to an earth station, the frequency received will not be different from the frequency transmitted. Depending upon the actual relative velocity of the satellite to the earth station, the frequency shift can be anywhere between plus or minus three channels.

Figure 4:
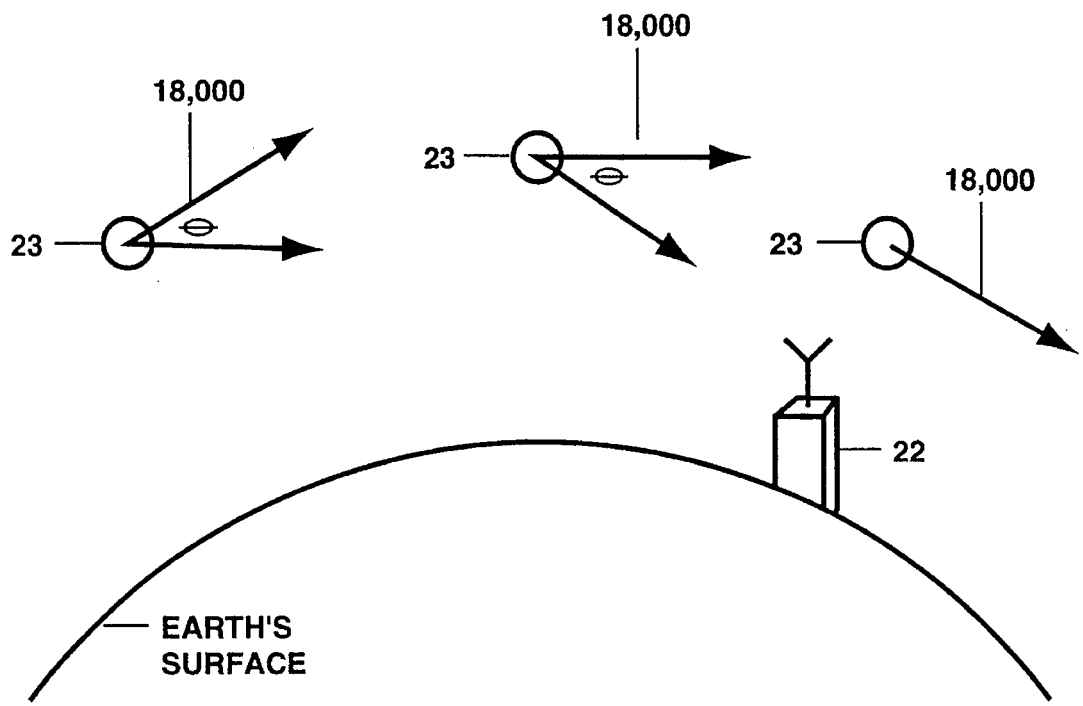
FIG. 4 is a sketch that indicates Doppler shift differences relative to an earth antenna based on relative position of the satellites.

Refer to FIG. 4. In this diagram the satellite 23 on the left is in orbit traveling at approximately 18,000 miles per hour. Hour, since the satellite 23 is moving somewhat tangential to the earth station (which may be either the remote 24 or the base site 22), the relative velocity between the earth station and the satellite is only 12,000 miles per hour. The relative velocity of the satellites to the earth locations is calculated by breaking the satellite velocity into two different vectors. One of these vectors points towards the earth location, and the other vector is perpendicular to the line to the earth station. The relative velcoity is calculated by the following formula.

$$Vel=Cos (\theta)*18,000$$

Where the Vel stands for the relative velocity of the sattellite to the earth location.

This 12,000 miles per hour will create a Doppler shift of about two channels. Consequently, when the satellite transmits on channel 47, the earth site will hear a signal on channel 49. However, the satellite directly overhead is also traveling at 18,000 miles per hour. However, the relative velocity of this satellite to the earth position is zero. Consequently, a signal that is transmitted on channel 47 arrives on channel 47. Consequently, in this diagram, two satellites could both be transmitting on channel 47, and yet an earth site could be receiving a single clear signal on channel 47.

All existing conversations add a tone or digital data stream to their conversation indicating the signal strength that is being received. Also all conversations add a tone or digital data stream to all transmissions indicating the actual channel number being used for transmission, and the actual channel number being used for receiving.

Consequently, each ongoing communication in the system will have the following information continuously added to the conversation:

1. Signal strength being received
2. Actual channel being used for transmission
3. Actual channel plus decimal fraction being received.

This information is utilized in the signal processing and computational method that makes channel assignments.

For example, a satellite near the horizon coming toward both a ground user, and the ground station might have as follows:

In the communication to the remote:

| 1. Signal strength | 30 DB |
| 2. Transmit on channel | 45 |
| 3. Receive on channel | 46.5 |

In the communication to the land line base station:

| 1. Signal strength | 45 DB (Better Base antennae) |
| 2. Transmit on channel | 31 |
| 3. Receive on channel | 32.4 |

Because large numbers of remotes and satellites are involved in the following discussion, the following terminology is used:

| Old Satellite | For a satellite already in communication |
| Old Remote | For a remote already in communication |
| New Satellite | A satellite that could communicate |
| New Remote | A remote that wants to communicate |
| Old Land Base | A land line base in communication |
| New Land Base | A land base that could communicate |

There are also two bands of frequencies involved.

| Remote Band | Remotes to satellite/satellite to remote |
| Base Band | Base to satellites/satellite to base |

The call set up procedure as will be explained herein is divided into two parts. Part I will connect the new remote to the satellite, and Part II will connect the satellite to the new ground base station. In each part there are four steps.

Part I

Establish new satellite to new remote channel assignments

The following technology is related to that disclosed in U.S. Pat. No. 4,965,850 issued to the inventor hereof, and that patent is incorporated herein by reference.

Step IA.

Figure 5A:
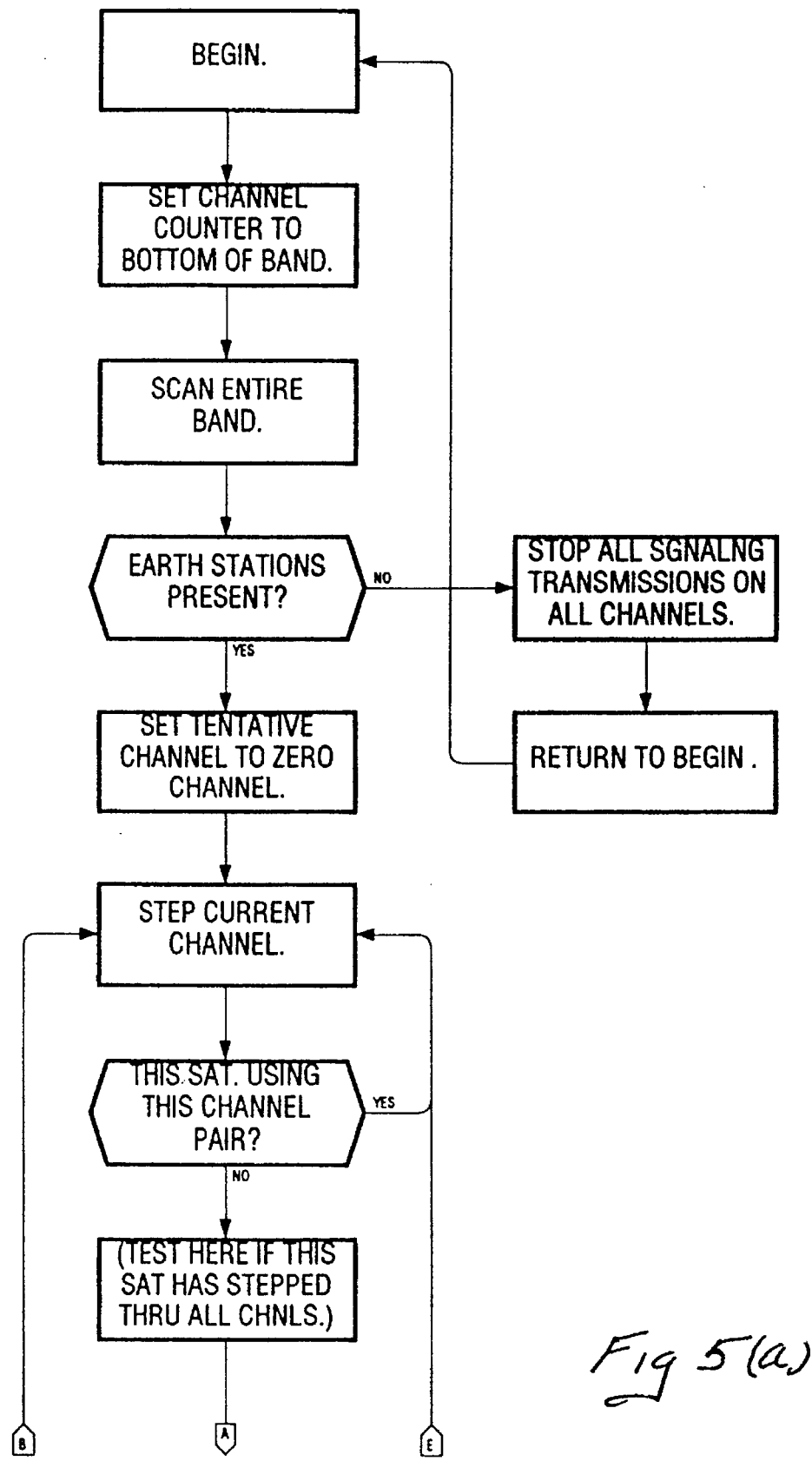
Figure 5B:
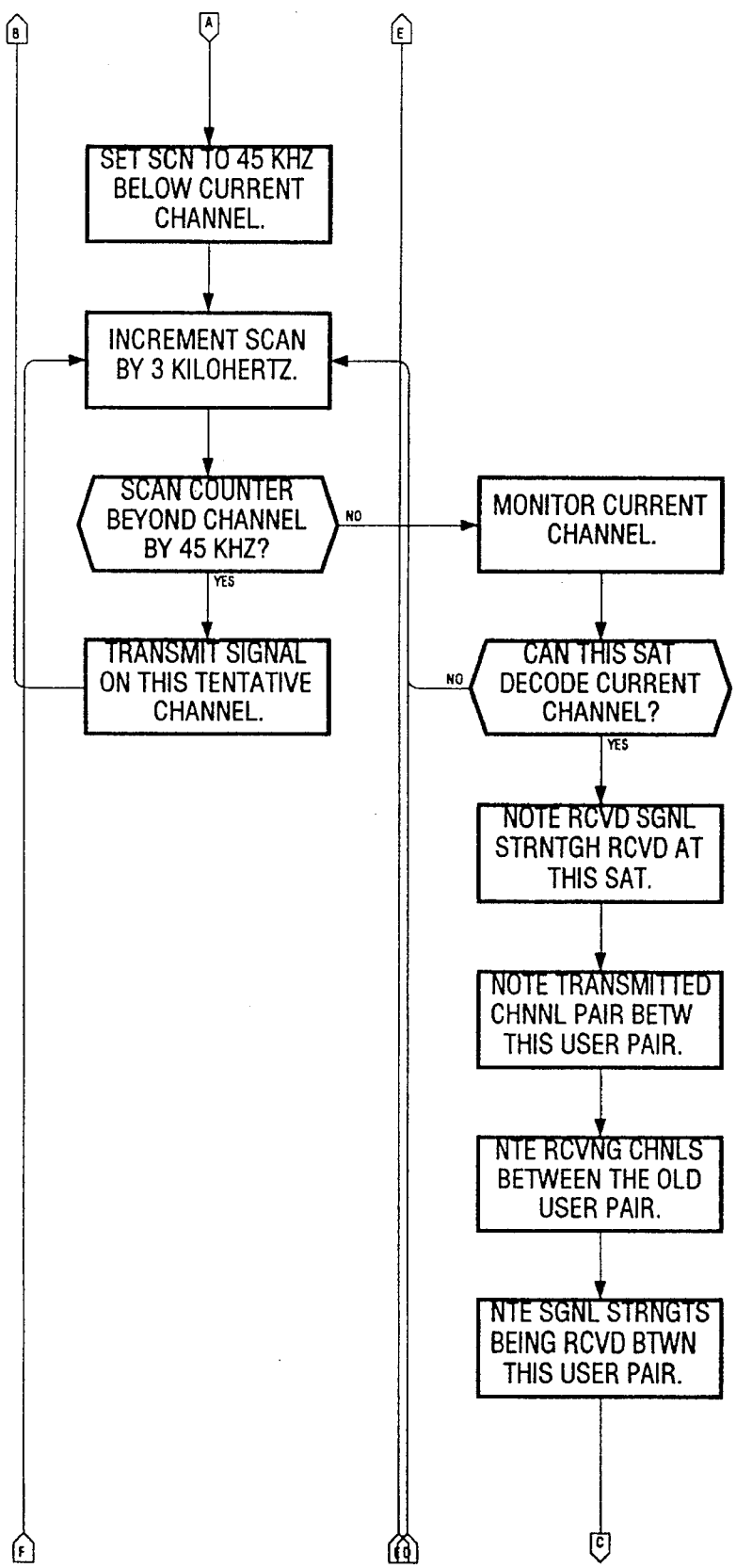

Will the new satellite transmission in the remote/satellite band of frequencies interfere with an old remote unit? Refer to FIG. 5 that shows a flowchart of the system logic for the following step 1A.

Before a new satellite even begins the following process of transmitting that it has a tentative channel, the new satellite monitors the band upon which the various earth stations are transmitting. If the new satellite does not hear any earth stations, the new satellite assumes that it is over an area without access to a ground station. The new satellite would then not begin the following transmissions and would remain silent.

The new satellites are sequentially examining all communications channels in the remote band. For example, let us assume the new satellite is examining channel 43 as a potential channel for transmission to carry on a conversation with a new remote. The new satellite receiver scans the spectrum in a continuous way from channel 40 to channel 46. This scanning process is well known and is similar to the scanning process that occurs when a radio listener searches an AM radio band for stations with good music. The new satellite discovers an ongoing communication. Let us assume that the new satellite hears this communication on channel 40.4. i.e., the new satellite hears a communication between channel 40 and channel 41.

The new satellite then notes the following information:

A. The new satellite hears a signal on channel 40.4

B. This transmission originated on channel 38.

C. The old remote is receiving on channel 36.

D. The old remote is receiving a signal at 30 DB

E. The new satellite is receiving a signal at 30 DB

The new satellite observes that since this transmission originated on channel 38, and the old remote is receiving on channel 36 that the other pair are having a frequency decrease and thus are moving apart.

The new satellite observes that since it heard this transmission on channel 40.4 that originated on channel 38 that it is moving toward the old remote.

In FM communications it has been experimentally determined that an unwanted signal will not cause problems to a desired signal of the signal is about 10 to 15 db weaker than the desired signal. A safety factor is added, and test is made for a 25 db margin. Since the Doppler will change the received frequencies during the duration of a call, it has been determined that a signal within 15 kc of the desired signal could potentially cause problems in a short duration. Consequently, if the undesired signal is within 15 kc of the desired signal, and if it is within 25 db of the desired signal, it would either cause or potentially cause interference and would not be suggested as an acceptable assignment.

The new satellite can calculate that since it hears a transmission on channel 40.4 and the transmission originated on channel 38 that the frequency being received from this old remote is 2.4 channels higher than the old remote transmitted. Since the new satellite and the old remote have velocity reproprocity, the new satellite calculates that if it transmitted on channel 43 that this old remote in question would hear a transmission on channel 46.4. This 46.4 channel is sufficiently distant from the channel upon which the old remote is using to receive (channel 36) that this old remote would not be bothered if the new satellite were to choose this (channel 43) channel for a transmission.

The new satellite continues to scan the channels from channel 40 to channel 46 and performs similar calculations. If the new satellite deduces that a channel is unsatisfactory, then the new satellite steps to the next channel as a tentative channel. The new satellite would then attempt to use channel 44 as opposed to channel 43. As the new satellite steps through the channels, some of these calculations are redundant, and are eliminated. However, all the steps are outlined here to convey the method of the invention.

When a new satellite discovers a channel upon which it will not interfere with an old remote, the new satellite then transmits on that channel a code in a random time slot indicating that this channel is available. The new satellite also includes in this transmission a number indicating the satellite's serial number. The satellite also includes a code indicating the channel upon which it is signaling. The satellite also includes codes indicating the serial numbers of the various land base sites that can potentially provide good communications links.

STEP 1B

Figure 6A:
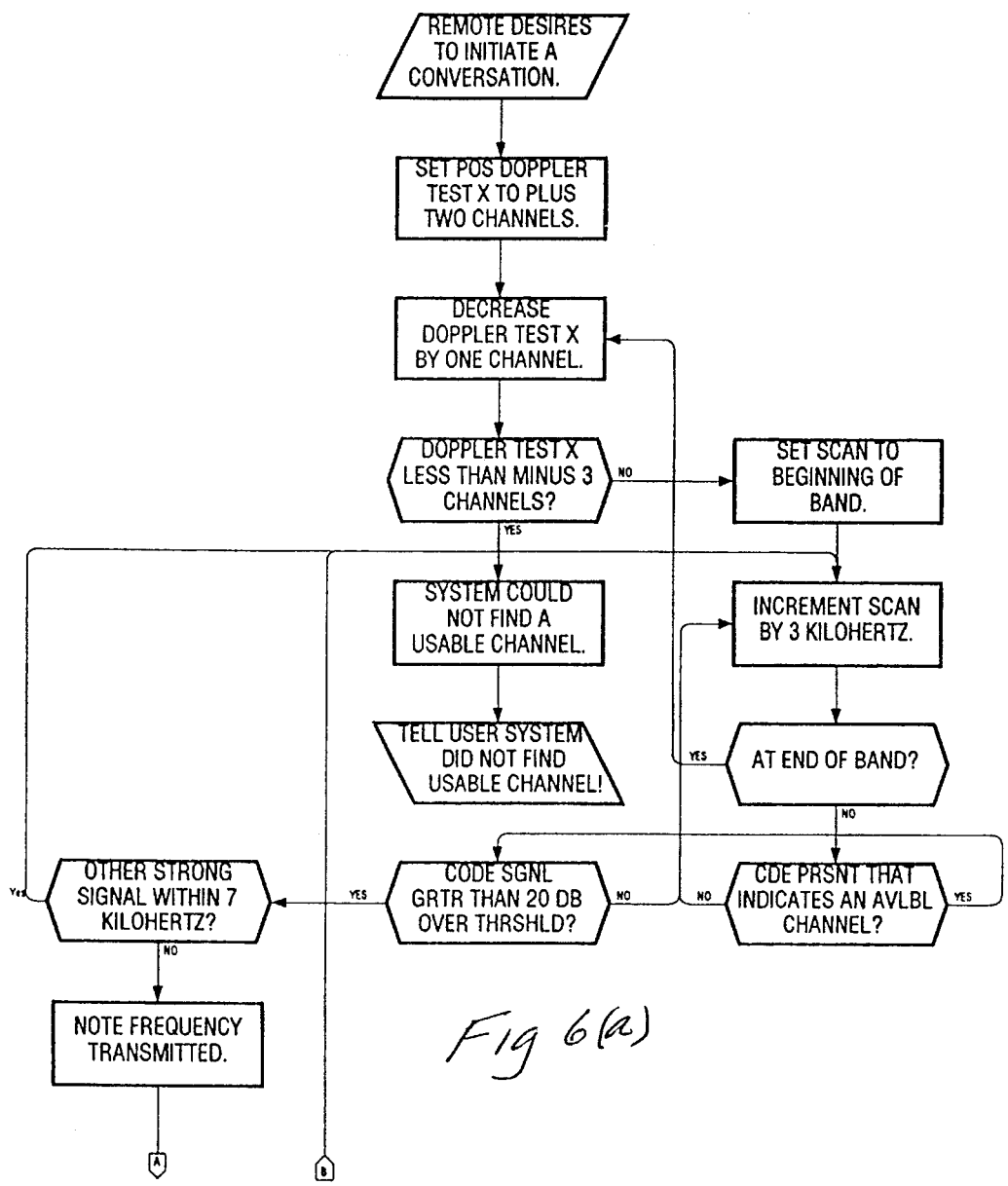
FIGS. 6(a) and 6(b) show a flow diagram that explains a procedure to determine if the remote will receive a good signal on proposed channel.
Figure 6B:
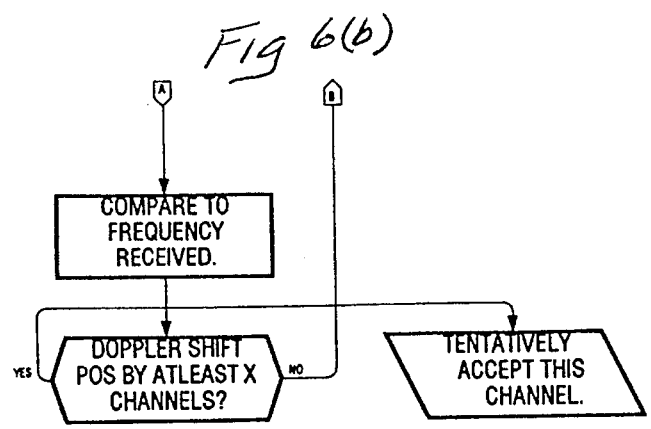

Will the new remote receive a good signal on the proposed channel? Refer to FIG. 6 for a detailed flow chart of step IB.

In the meantime, a new remote is desirous of setting up communication with the satellite network. The new remote monitors the various channels and searches for codes that indicate a channel is available. Actually, the remote is scanning the available band, as received signals would not land on exact channels.

Frequently, the new remote will not hear various satellite transmissions because they are masked by ongoing conversations. The new remote will only respond to those signal transmissions that it hears clearly. Since the new remote finally listens on the channel that it hears the transmission, the various Doppler shifts are automatically taken into consideration. As an added precaution, the remote monitors one half channel above and one half channel below the intended channel. If the remote notes a strong signal near the desired tentative channel, the remote ignores this tentative channel, as the shifting caused by the Dopplers could bring this channel into an interference causing situation.

Normally, a new remote unit will have a choice of various satellites, and the remote must choose between a variety of potential satellites. However, as the satellites orbit the earth, some satellites will be approaching the remote unit, and others will be leaving the remote unit. Others will be distant from the mobile unit, and be on a tangential course such that they have only a small relative velocity with respect to the remote unit. The various relative velocities of various satellites will create a variety of frequencies because of various Doppler effects. Refer to FIG. 11. Satellite 55 is moving away from the remote. Because the distance between the remote and satellite 55 is increasing, the remote will hear a frequency less than was transmitted. Satellite 54 is moving towards the remote. Since the distance between satellite 54 and the remote is decreasing, the remote will hear a higher frequency than was transmitted. The new remote unit notes the transmitted frequency of the signals from the various satellites, and the new remote attempts to choose a satellite with a high frequency increase (at least one channel) as a potential channel. The remote will only choose a channel such that the received signal is at least 20 DB over threshold. By avoiding channels where the remote hears a weak signal, the remote only chooses channels where the satellite is in a position to provide good coverage. If a building or mountain is in the line of sight, a good signal will not be received, and the remote will attempt another channel.

For example, in FIG. 11, satellite 32 and satellite 11 will both have increasing Doppler. However, they might be near the horizon and might be providing a weak signal. In this particular instance, the remote would choose satellite 55 even though it has a negative Doppler shift.

Once a good signal is received with an increasing frequency, it is unlikely that the position changes of the satellite would decrease signal quality. This satellite and this channel will become the tentative channel for communication by this remote. By choosing a high frequency increase, the remote unit ensures that he has picked a satellite that is moving toward him at a great velocity. That choice would imply that the satellite is not overhead and coming directly towards the mobile unit. Such choice selects a satellite that will be able to serve the mobile for a long duration. Satellites that have already passed overhead, and are leaving the vicinity of the mobile will have a decreased frequency and such satellites will not initially be chosen. Satellites that are on the horizon with only a tangential velocity will show very little Doppler shift, and will not be normally chosen.

If the new remote initially does not find a satellite with a very positive frequency shift, then the new remote relaxes the Doppler criterion and would accept a satellite with just a positive frequency shift. If the new remote still does not find an acceptable satellite, the new remote keeps relaxing the Doppler condition until any satellite would suffice. In this instance the new remote will chose a tentative channel with a near neutral or negative Doppler.

This procedure selects a good tentative channel for the new remote upon which the remote will receive a good signal. Most of the time this procedure for selecting a positive Doppler shift also yields a channel that will serve the remote for a maximum useful duration.

Step IC

Figure 7A:
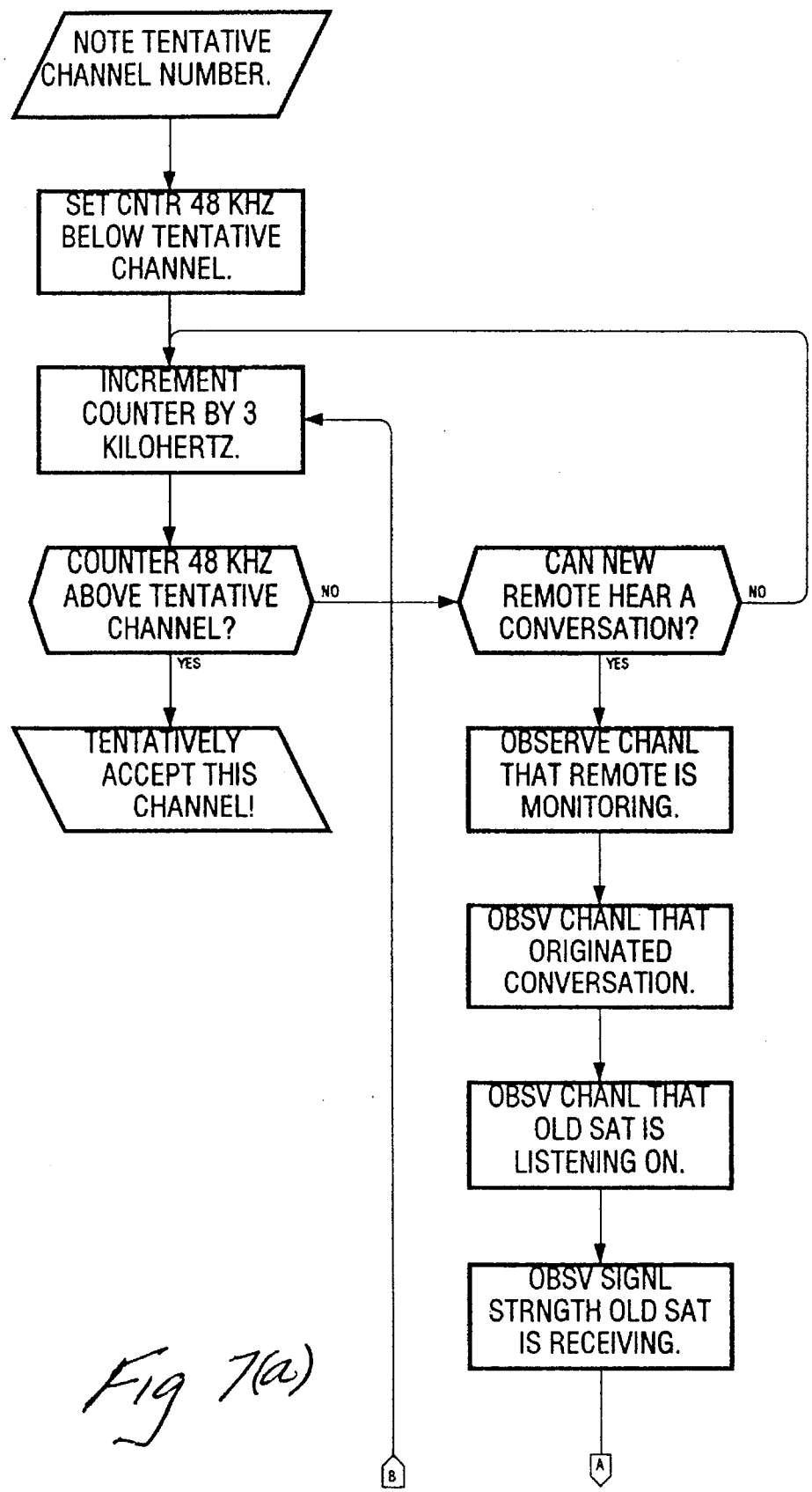
FIGS. 7(a) and 7(b) show a flow diagram that explains a procedure to determine if the new remote will interfere with a previously assigned satellite.
Figure 7B:
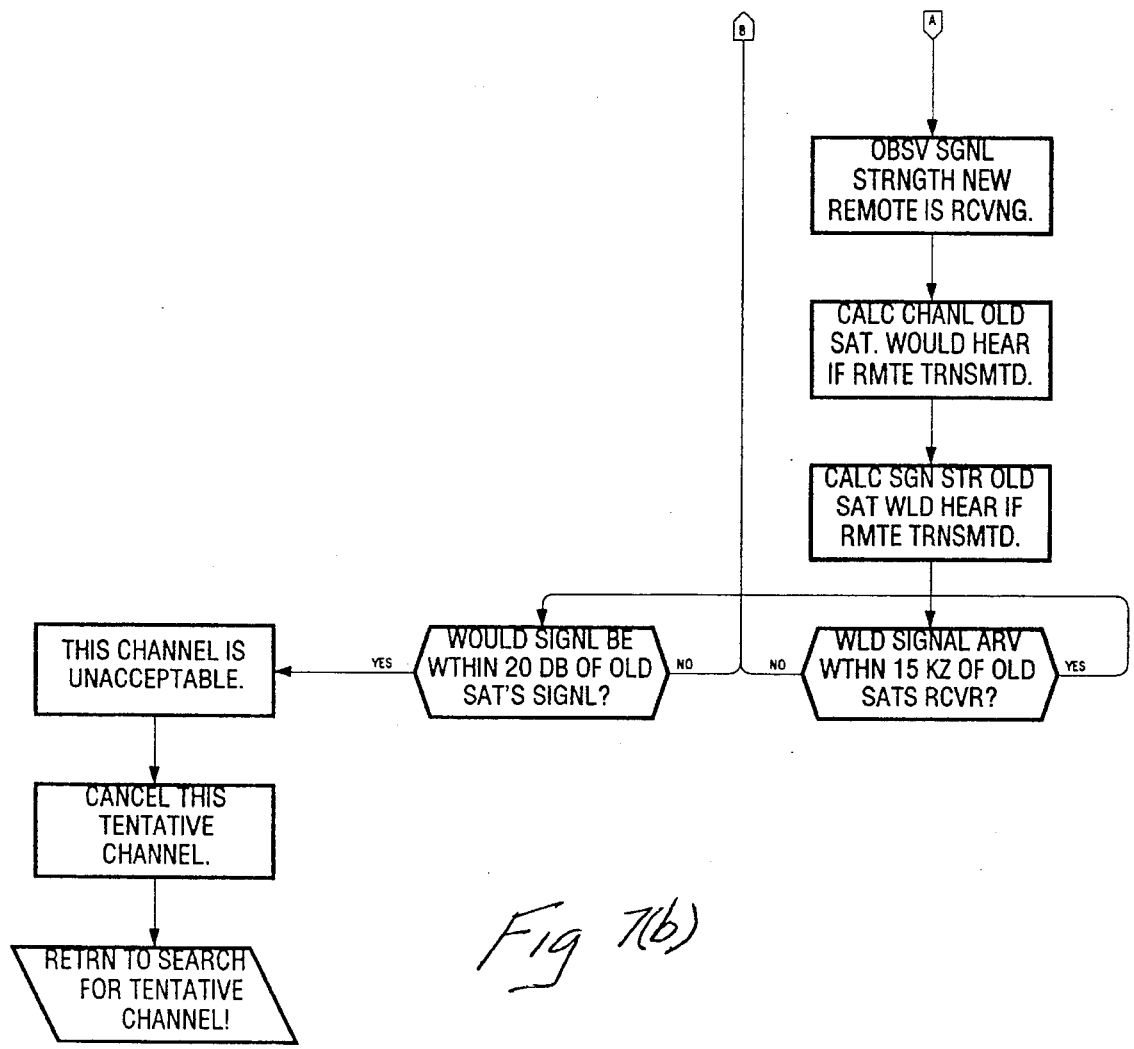

Will the new remote interfere with a previously assigned or old satellite? Refer to FIG. 7 for a flow chart of the logic for Step IC.

The new remote now monitors the channels near the tentative channel. For example, if channel pair 43 is selected as a tentative channel pair, the new remote will monitor channels 40 thru channels 46. The new remote will listen to the various old satellites, and might hear as follows:

A. The new remote hears a signal on channel 42

B. The above signal originated on channel 44

C. The old satellite is listening on channel 46

D. The old satellite is receiving a signal at 32 DB

E. The new remote is receiving a signal at 28 DB

Consequently, the new remote can calculate that if it were to transmit on channel pair 43 whether it would interfere with the previously assigned receiver at the old satellite. In this particular case, the old satellite is moving away from the new remote (it hears a signal on 2 channels lower channel than was transmitted). Consequently, if the new remote transmitted on channel 43, it would be received at the old satellite on channel 41. However, since the old satellite is listening on channel 46 this does not pose a problem.

If the new remote would interfere with a previously assigned satellite, the new remote would try another channel.

Step 1D

Will the new satellite be able to listen to the new remote on the tentative channel? Refer to FIG. 8 for a flow chart of the logic for step ID.

Next, the new remote attempts to signal the new satellite on the proposed channel. The new remote already knows that it will not interfere with any previous conversations.

If the new satellite hears the new remote, the new satellite knows that all four tests have been completed, and that a conversation between the new remote and the new satellite can begin. The new satellite signals the new remote that all is well, and that communications will soon commence.

If the new satellite can not satisfactorily hear the new remote, the new satellite will not respond to the signal from the new remote. If the new remote does not get a response, it assumes that this channel is unsatisfactory, and the new remote attempts another channel.

Part II

Establish satellite to ground station assignments.

Next, the new satellite must now find a ground station to accept the call, and a channel also must be assigned in the satellite to ground station band. In this part of the call set up the satellites initiate the calls, and the land bases perform the initial tests to determine tentative channels for signaling. The logic to set up this link is similar to the logic to set up the mobile to satellite link. Because the logic is essentially identical, it will not be explained in the detail used for the mobile to satellite channel set up logic.

Part IIA

Will a ground station interfere with a previously assigned satellite receiver?

In this particular part of the call set up process, the various ground stations are transmitting codes on those channels where the ground stations know that they will not interfere with an existing conversation. These transmissions also include the ground station serial numbers. The ground stations observe the signals from the various old satellites. The ground stations observe the various signals and the frequency shifts and calculate in a manner as above whether they can transmit signals on a given communication channel. The method involves the various Doppler shift calculations in a manner similar to the setting up of the other tentative channel.

Part IIB

Will the new satellite hear a good signal from the new ground station that will not be interfered with by an old ground station?

Many times the various signal transmissions from the new ground stations will be masked by other ongoing communications from old ground stations. The satellite will only hear those signals from the new ground station on channels that would be acceptable for communications.

The satellite also keeps a current table of the ground station serial numbers that it hears.

The satellite will only choose situations for the satellite to ground link that have a positive Doppler shift in a manner as described earlier.

Part IIC

Will the satellite interfere with a previously assigned or old ground station?

The satellite searches for a tentative ground station channel. The satellite initially only chooses a channel with a positive Doppler shift to insure that the satellite is moving towards the ground station.

The satellite now scans the entire range of channels within the Doppler shift range; that is, the three channels above, and the three channels below. If the satellite concludes that it would interfere with an old ground station, the satellite searches for a new tentative channel.

If the new satellite finds a channel upon which it would not interfere with an old ground station, the new satellite signals the new ground station on that tentative channel that it wants to begin communications.

Part IID

Will the ground station hear a good signal from the new satellite?

When the satellite signals the new ground station on the tentative channel, the ground station will hear the transmission on a shifted channel. If the ground station hears a good signal without actual interference, the ground station knows that this is a good channel, and completes the call set up process.

In U.S. Pat. No. 5,119,504 issued to Motorola, the satellite system knows the location of the satellites and ground user. Consequently, in U.S. Pat. No. 5,119,504 adjustments to transmitted frequencies are precalculated to accommodate the Doppler shifts. In contrast to that approach the approach described herein accepts the shifts, does not keep track of either satellite locations or subscriber locations, and lets the Doppler shifts occur. The approach described herein accommodates the Doppler shifts as they occur, and does not preplan for them.

Call Length Discussions

In today's cellular, conversations tend to be long and comfortable. Although the cost per minute is high, the users of cellular typically take their time to discuss a particular issue, and the call is not limited to a short discussion. During the course of normal cellular land based conversations, the mobiles frequently move and become distant from their assigned base, and become close to an alternate base. To provide better service, the mobiles are usually "handed off" to the alternate base.

In the satellite system, where various satellites move at tremendous speeds, the frequency reuse problem is continuously changing. A satellite that is in a previous conversation can suddenly appear over the horizon and interfere with an existing conversation.

Since satellites typically move at speeds over 18,000 miles per hour, we observe that in a single minute a satellite would move over 300 miles. Consequently, the relative position of the satellites above any given user will change dramatically during the process of a normal call. Consequently, this system has a maximum call segment length of one half minute before handoff must be effected.

Various computer messages will naturally find that a half minute is normally more than enough to meet their limited requirements. In this system, voice conversation segments will be limited to one half minute, and then they will be automatically forced to go through the above call set up procedure for a handoff. Such handoffs are common in cellular radio, and the user is typically not even aware that he has been handed off to a different site. In the satellite system, the user will not know that he has been handed off to a different satellites.

Handoff Discussions

In the current operating land based cellular radio systems in the United States, users are automatically forced into a handoff situation when their signal quality degrades. Signal quality is measured continuously, and when it falls below a certain predetermined level, handoff procedures are initiated. Either a weak signal caused by increasing distance from the concerned base, or an interference situation can cause signal quality degradation.

In the satellite system described herein, similar technology is used, and when signal quality degrades, the handoff process is initiated. Signal quality in the remote to satellites link could degrade due to a satellite becoming to far away from either its mobile user, or an interference situation. Signal quality in the satellite to land base site link could degrade due to a satellite becoming to far away from its land base, or an interference situation.

There is a potential problem in that the call set up process could be reinitiated, and a different land base might be involved. Since the call is being routed into the land line network from a previously chosen land site, the entrance of a new land base would cause the call to be dropped. For example, a remote user located near Chicago, Ill. could be routed through a Milwaukee, Wis. land base site. However, upon reinitiating the call set up process, a base site in St. Louis, Mo. could be chosen, and the call certainly would be lost. Although the satellites are moving at tremendous speeds, the relative location of the land based base site and the land based mobile (remote) stay relatively constant. For example, the user mentioned above who is near Chicago, would still be near Chicago one minute later even though the concerned satellite would have moved considerably.

Figure 9A:
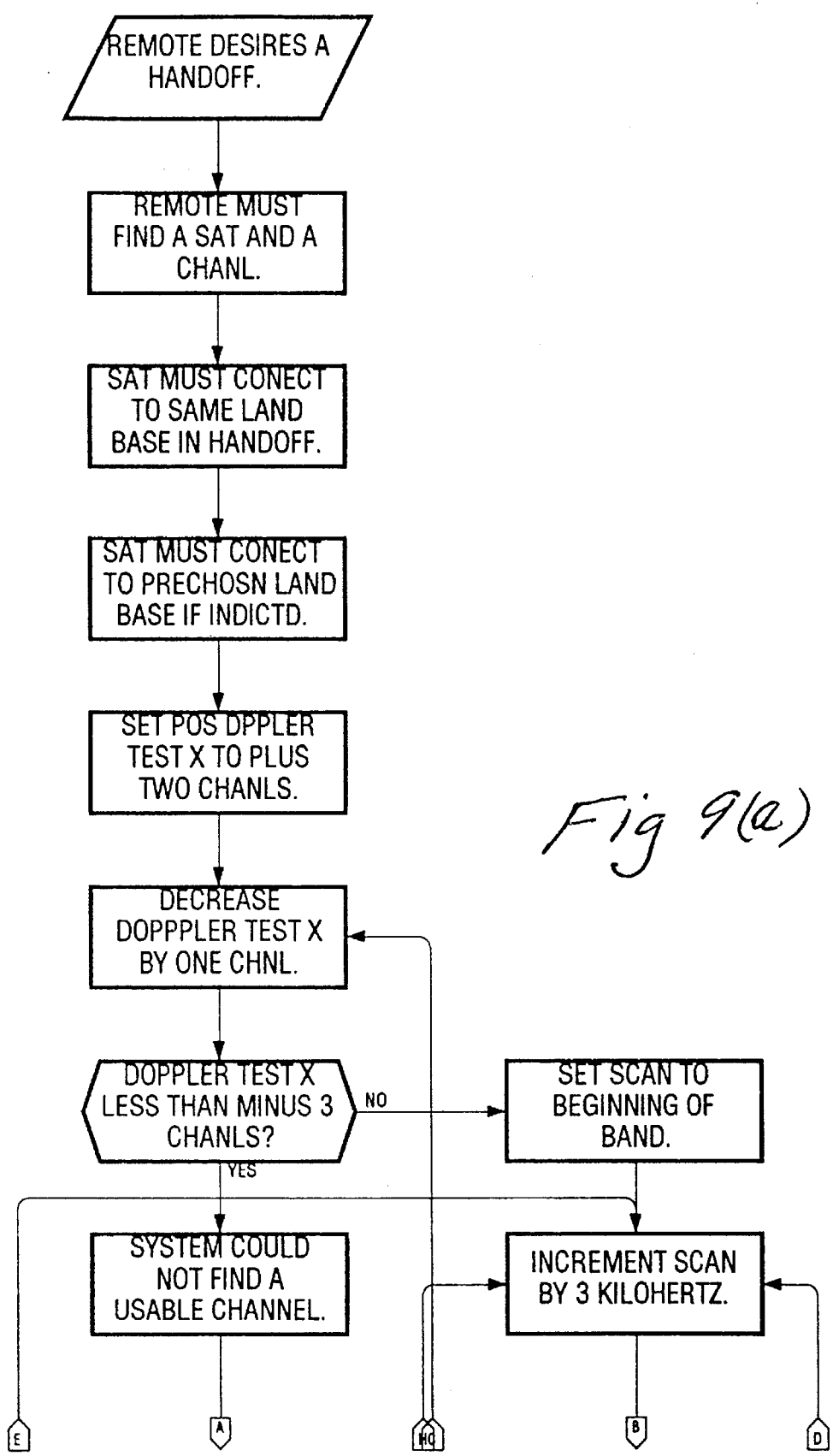
FIGS. 9(a) and 9(b) show a flow diagram that explains the handoff and pre-selected base site procedure.
Figure 9B:
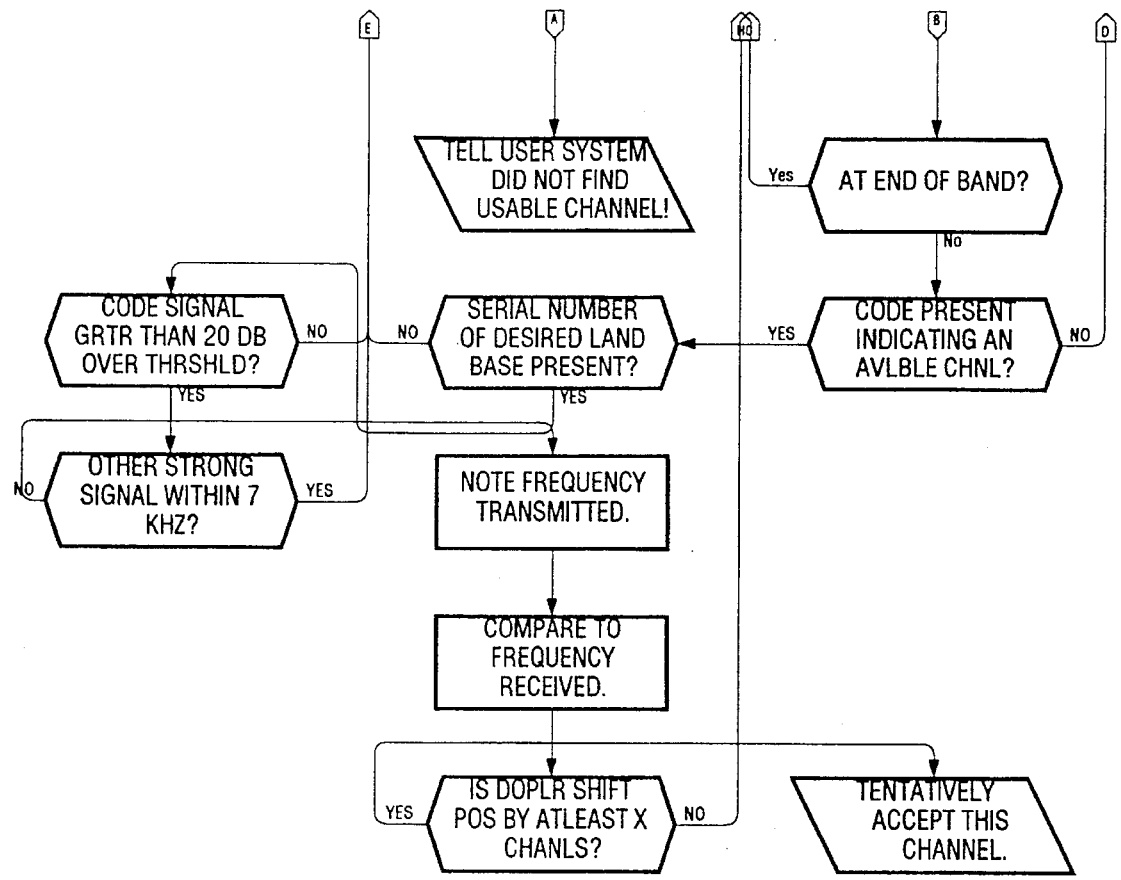

Consequently, the system is designed such that various satellites might be changed out, but the same base sites stay involved during a handoff. During a handoff process, the remote will only consider satellites that can reach the concerned base. This adds another step in the logic in step Ib above. Refer to FIG. 9 for flowchart of handoff logic.

In the statistically rare case that the mobile user can not find a satellite that can reach his current base, the call is automatically terminated. Because both the mobile to satellite link and the satellite to land base link are chosen with good positive Doppler shift, the operation of the system tends to pair mobile users with land bases that are relatively close to each other.

Special Considerations

The approach described herein seeks to lower total system cost though the elimination of several costly subsystems in conventional LEOS systems. With a lower system cost, the ultimate cost for an individual subscriber to make a telephone call, or receive a digital message is lower. However, the design of this system presents some potential problems in call set up that will translate into high costs for the subscriber.

Consider a subscriber who lives in the mountains of Northern Italy, who wants to use his subscriber phone to usually contact various land line phones in Italy. Based upon the description of the system, sometimes his calls will be received by the Italian base station. In these particular instances, the cost to route his call will not be severe. However, upon receipt of his phone bill, he would note that some of his calls were routed through Greece, others through Algeria, others even through Norway. In some instances his calls would not even be completed because they might be received by countries that have unsatisfactory phone service.

In the handoff scenario, it was observed that the process of continuation of a call through handoff dictated that a specific base site be included in the new links. The solution to the complexities of system use for the subscriber in Northern Italy is handled in a similar manner. Each subscriber unit can be manually programmed to accept only certain base sites. The paper directions that are supplied with the handset show the locations of the base sites, and these directions explain the call routing problems. Each subscriber has the option of letting the satellite system select the base site, or letting the subscriber unit limit the choice to base sites to locations that will limit the call interconnect charges. Entering the numbers of the acceptable base sites into the subscriber unit is a small inconvenience compared to the phone charges that would otherwise ensue.

This process of entering the numbers of the acceptable base sites would also be important in the United States. A user located in central Illinois who wanted to call Chicago would naturally prefer that the call be routed through the Chicago base site. If the call were routed through the base site in Kansas city, the costs would be higher. This is an optional feature in the subscriber unit that will help contribute to lower costs for the system user.

The method of assigning channels as described herein can be used with any pattern of directional or beam antennas. Directional antennas permit an enhanced amount of frequency reuse. Directional receiving antennas on the satellites will provide grin, and consequently, a weaker signal will be acceptable. Directional transmitting antennas on the satellites will permit a greater signal power to be directed locally to a limited area on earth which will provide the earth subscriber units with a better signal.

Figure 3:
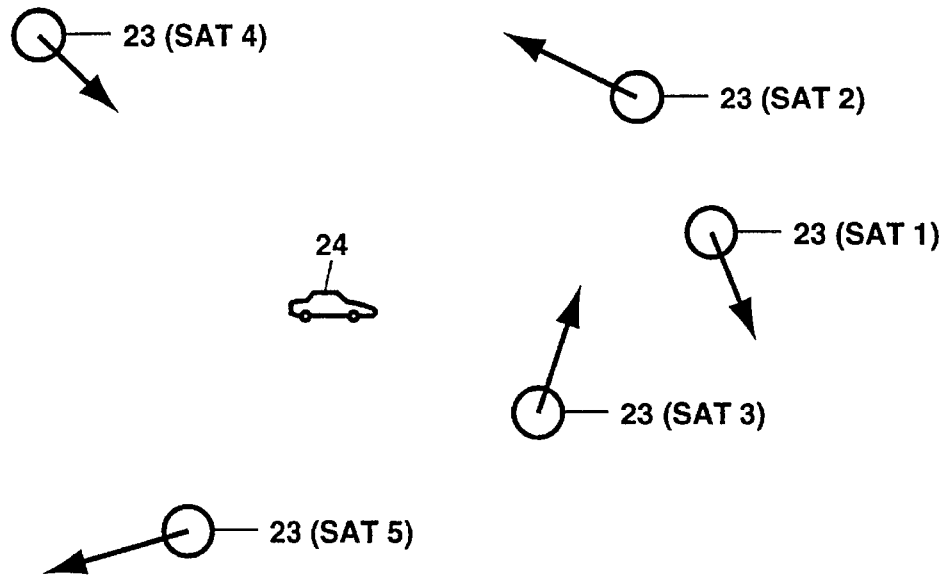
FIG. 3 is a sketch that shows a typical pattern of satellites having random orbits relative to each other with respect to a mobile user.

The preferred method of utilizing directional antennas would be to divide the area below a satellite into four different quadrants. One fourth of the channels on board the satellite would be assigned to each quadrant. An alternative embodiment of the inventive system will now be described. This new embodiment removes the orbit control rockets, orbit control system, and large amounts of rocket fuel from the satellites, and lets the satellites orbit without earth control, or actually orbit in a free or non controlled manner. Naturally, a satellite in orbit traverses a carefully defined orbit based upon its initial position and velocity. However, by removing earth control, and intentionally creating diverse orbits for the individual satellites, the satellite orbits with respect to each other will appear to be random. To a user on the surface of the earth, the various satellites above going in different directions will appear to be random. FIG. 3 shows a typical group of satellites that might be overhead of a specific location on earth. Consequently, we shall refer herein to such as a system as a random orbit satellite system.

The small rockets and onboard control system that keep the satellite antennas pointed towards earth remain in the system.

DETAILED DESCRIPTION OF THE INVENTION

Presently, most of the proposed LEOS satellites systems are grid or pattern style systems wherein the satellites orbit in a preplanned pattern. We have found that our present system for channel assignment operates equally well for a pattern style system as it does for a system where the satellites are in a random orbit as defined above.

The strategy of a random orbit satellite telephone system consists of orbiting 200 smaller satellites instead of the proposed 70 satellites. Since these satellites will orbit in a random manner, a ground or earth controller need not be present to control the orbits of the satellites.

Since these satellites will not need orbit correction abilities, the various rockets, computer control system, and large amounts of rocket fuels will not be present in the satellites. Many of the complicated features present in U.S. Pat. No. 5,303,286 will be simply eliminated. This will achieve a significant reduction in the weight, size, complexity, and cost of the individual satellites while providing better results.

Because of the random nature of the system, redundancy is built in. The failure of any one unit does not significantly alter the system operation. Back up satellites are not required.

In addition, since there will be more satellites, the amount of radio telephone equipment on each satellite will be reduced. Additional radios for extra capacity can be added to the system by merely launching additional satellites to increase the number beyond 200 units.

The weight per satellite is reduced from 1,500 pounds to less than 200 pounds per unit because of the elimination of rocket mechanisms and orbit control mechanisms. These 200 units at 200 pounds each make a total weight of 40,000 pounds which is about one third of the weight of a standard proposed LEOS system. This reduction in launch weight will considerably reduce the launch complexity and cost. In addition, a further reduction in weight will be obtained because broad band amplifiers are now being perfected and will be available in the near future. These amplifiers will permit the elimination of a radio for each channel. Instead of a radio for each channel, a single broad band amplifier can amplify many signals simultaneously. This will permit another significant weight and cost reduction.

Furthermore, because the inventive system does not need an orbit control system, the engineering work to design the inventive system will be also reduced considerably. A basic advantage is that a master ground or earth station does not have to be designed; and further an orbit control system onboard each satellite does not have to be designed.

The following are the operating system parameters:

| | |
|---|---|
| Number of Satellites in Random Orbit | 200 Units |
| Typical Height of a Satellite | 500 Miles |
| Number of Base Sites | 1 Minimum |
| Operating Frequency of System | 1,800 Megahertz |
| Spectrum set aside for total system: | 42 Megahertz |
| Spectrum for up link for remote unit | 10 Megahertz |
| Spect. for down link for satellite to remote | 10 Megahertz |
| Spect. for up link for landline network | 10 Megahertz |
| Spect. for down link by satel. to land line | 10 Megahertz |
| Spectrum for paging satellite to satellite | 1 Megahertz |
| Spectrum for paging satellite to ground | 1 Megahertz |
| Channel spacing | 15 Kilocycles |
| Guard Bands at end of each block | 50 Kilocycles |
| Number duplex channel pairs in the system for satellite to remote: (650 channels talk up, 650 channels down) | 650 |
| Number of duplex channel pairs in the system for satellite to land line (650 channels talk up, 650 channels down) | 650 |
| Duplex channel pairs required to per call | 2 |
| Number of Satellites in initial launch | 200 |
| Number duplex pairs per satellite (mobiles) | 40 |
| Number duplex pairs per satellite (landline) | 40 |
| Times a channel typically is reused | 5 |
| Paging channels (single) | 40 |

The present system can support about 3,250 different simultaneous phone calls. The 650 channel pairs can be used once in a given geographic area. A reuse factor of five yields 3,250.

Time division multiplexing is incorporated in this system to enhance system capacity. Voice conversations can be compressed into small time slots, and several conversations can be put on a single channel. For purposes of explaining the paging and signaling and call set up process, a single channel assignment is described. Moreover, the process of time division multiplexing is incorporated in the system by considering each time slot on a channel, as a logical channel in the following explanation. System Assures Excellent Communication Coverage.

A satellite in an orbit 500 miles high sees to a horizon about 1937 miles away. For example, a single satellite over either Missouri or over Nebraska will cover most of the United States. In fact, a satellite at an altitude of 500 miles will cover a square area 12 million square miles. The surface of the planet earth is about 197 million square miles. Consequently, a single satellite can cover about six percent (6%) of the surface area of the planet.

The distance to the horizon is a concept that was developed by the ancient sailors. As one sails away from a lighthouse, it does not fade into the distance, but actually drops below the horizon. These calculations are based on straightforward trigonometry. This distance to horizon concept was key in the development of the initial cellular radio system. Frequency reuse was guaranteed in that potential offending transmissions are below the horizon. We present herewith a table for distance to the horizon for various satellite altitudes. The following calculations are based on a perfect sphere, and consequently, are only approximate.

| Altitude | Distance to Horizon |
|---|---|
| 100 Miles | 968 Miles |
| 500 Miles | 1,937 Miles |

It is observed from the above table that increasing the altitude of the satellites from 100 to 500 miles by a factor of five only doubles the distance to the horizon. When a satellite has a distance to the horizon of 1,937 miles, it covers an area of approximately Pi times Radius squared.

$$3.14 \times 1,937 \times 1,937 = 11.8 \text{ million sq miles}$$

Since the surface area of planet earth is 197 million square miles, we can see that a single satellite 500 miles high covers about 6 percent of the earth's surface.

$$11.8 \backslash 197 = 0.06 \text{ or six percent}$$

The 200 satellites in random orbits will on average cover the earth 12 times over (200 times 6 percent)! In fact, on average a citizen in Chicago will be able to observe on average about 12 satellites in the sky above him. If he was lucky, he might see as many as 14 or even 15, and if he was unlucky, he would see perhaps only 9 or 10 satellites.

The large number of satellites available to an earth user guarantees that the user will be able to select a satellite that will provide a strong signal. In the grid or pattern systems with fewer satellites, a user is frequently assigned to a satellite that is not directly overhead. Consequently, even with less weight in orbit, the user of the random orbit satellite system is guaranteed a better signal than would be received from a grid system.

Since an individual satellite covers 6% of the earth's surface, the chance that an individual satellite will not cover a specific spot on earth is 94%. With 200 satellites in random orbits, the chance that a particular spot on earth will not be covered by any satellite can be calculated as 0.94 to the 200th power. Consequently, the chance that a single place on earth will not be covered by any of 200 satellites is about 0.0004 percent. For our Chicago user, this means that the chance that he would not see a satellite is only 4 chances in a million.

0.94*200=0.000004 or 0.0004 percent

If, however, there were only 180 units in operation, the chances that a particular spot would not be covered is 0.94 to the 180 power. This calculation yields 0.0000145. Consequently, the chance that a given spot on earth would not be covered 14 in a million.

If however, there would be only 150 units in operation, the chances that a particular spot on earth, Chicago for example, would not be covered would be 0.94 to the to the 150 power. This calculation yields 93 chances in a million that a spot would not be covered. The following table shows the relative effectiveness of different numbers of units in a random orbit satellite system.

| Number of Units | Chances of not covering Chicago |
| --- | --- |
| 200 | 4 in a million |
| 180 | 14 in a million |
| 150 | 93 in a million |
| 120 | 596 in a million |
| 100 | 2054 in a million |

The system will perform satisfactorily with any number of units over 180. If significantly less than 180 units are used, the chances of a point on earth not having coverage at any time becomes too large. If over 230 units are used, the system performs better, but the cost advantage of using random satellites no longer is as significant. Consequently, 200 units are chosen as the initial number of units to be launched. As various units fail, the system still performs very satisfactorily until at least 10% of the units have failed. 180 units still provides a very good chance of covering a particular spot.

Figure 10:
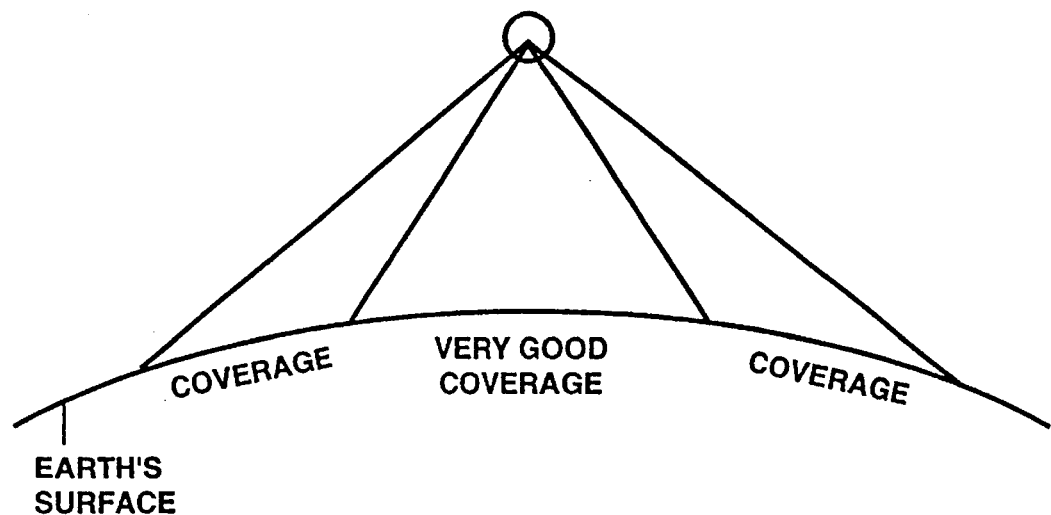
FIG. 10 is a sketch that shows the distance to horizon concept.

A satellite in an orbit 500 miles high will be required to provide coverage out to an angle of about 62 degrees to reach the horizon, see FIG. 10. Even at that long distance, radio propagation is adequate for suitable communications. However, it is known that earth objects such as buildings and mountains would frequently interfere with the propagation path.

Moreover, because of the fact that many of the visible satellites for a Chicago earth user typically might be near the horizon and not provide very good radio coverage because of the building shadows, it should be understood that usually only 1 or 2 satellites will be in position to provide very good radio coverage. Consequently, the chances of not having a satellite in a good position are somewhat greater than the chances of not being able to see any satellites.

The various buildings in Chicago are a severe propagation handicap. Users in Chicago need as many visible satellites as possible. Consequently, the random orbit satellite system is more apt to have a unit directly overhead than the grid system. Because the inventive system has approximately three times the satellites as compared to known technology, the probabilities of one or more satellites being in a position to provide coverage around building shadows, as occur in cities such as Chicago, is greatly enhanced.

Because of potential coverage problems it is important to make very careful radio frequency channel assignments. As is explained herein, the Doppler shift is used to insure that only assignments will be made where the radio propagation will improve during the conversation. Only when a positive Doppler is not available as explained herein, will the system use a negative Doppler alternative. This key feature of the invention helps compensate for the chances of not having a satellite directly overhead.

Satellite Launch

One satisfactory, yet expensive method of launching 200 satellites into 200 different random orbits would be to launch each individual satellite into a different orbit. These orbits can be created in advance by off line computers that would generate 200 different orbits. Each of the satellites would be launched individually into the preplanned orbit. However, technology as explained in U.S. Pat. No. 5,295,642 which discusses airborne launching systems could be used to control the cost.

However, if a single launch vehicle were used, and the satellites were jettisoned sequentially from a single space platform, they would end up orbiting the earth in a cluster. A potential user in Chicago would typically see zero satellites overhead, but very rarely he might see 200 of them at once. Such a system is clearly unsatisfactory.

However, if a single launch vehicle were used, and the satellites were jettisoned at slightly different velocities, their orbits would still be great circles, and would only be slightly inclined from the orbit of the launch vehicle. Such a system is clearly unsatisfactory.

However, there are various alternatives to create patterns of satellites in fixed orbits that would appear like satellites in random orbits to earth users. Thus although the satellites would be in well defined orbits with a well defined plan, they would appear to be random to an earth based user.

A lower cost approach other than launching 200 satellites into 200 different random orbits method is to create 20 different planes similar to those explained in U.S. Pat. Nos. 5,274,840 and 5,161,248. In each of the planes there would be 10 different satellites. The satellites in each plane would move at different velocities, and consequently each of the satellites in each plane would be position independent from the other satellites. Consequently, the relative position of each satellite in its plane would appear to an earth user to be random. Because there would be so many different planes, the satellites would appear to be random to the earth user.

By choosing only 20 different planes as opposed to 200 different random orbits, the system launch complexity is greatly reduced. The 10 satellites in each plane can be launched as a group. To create slightly different orbits with different velocities and altitudes in a single plane can be achieved easily with well known technology.

In the grid approach it is imperative to keep the satellites at precisely the same altitude so that they orbit at the same speed and maintain the grid pattern. However, in the inventive approach altitude is not important. Individual satellites can be at various different altitudes, and this does not impair satisfactory system performance.

Consequently, in the initial launch the satellites in each plane are placed at slightly different altitudes with different velocities. Although the chances of collision are low, the intentional placement of the satellites at different altitudes forces the chances to be nil. Consequently, the individual satellites in a given plane will appear to be randomly located with respect to each other. The following table shows the altitude and velocity of four of the 10 satellites in a given orbit plane.

| Satellite number | Altitude | Approximate Velocity |
| --- | --- | --- |
| 1A | 500 miles | 18,769 mph |
| 2A | 502 miles | 18,773 mph |
| 3A | 504 miles | 18,777 mph |
| 4A | 506 miles | 18,781 mph |
| to 10A | etc. | etc. |

It is observed that the velocity difference of the satellites in different orbits only 2 miles apart is about 4 miles an hour.

The method to create these different orbits would be to launch a single satellite from a space craft, and then the space craft would fire on board rockets to raise its altitude by two miles and its velocity by four miles an hour. Then another satellite would be released.

Initially, these satellites would orbit in a cluster, but as time increases, they would naturally separate. Two satellites in orbits 2 miles apart would separate at about 4 miles an hour. It would take one day to separate them about 100 miles. A month would separate them by about 3,000 miles. Four months would separate them by 12,000 miles. Naturally, these orbits should not be exactly 2 miles apart, or some pattern might develop that would be detrimental to system coverage.

The non adjacent satellites in any given plane would naturally separate at an even faster rate. After several months in orbit, all the satellites within any given plane would essentially appear to be in random positions within the given plane.

One of the advantages of this non patterned approach is that additional satellites can be placed into orbit at a later time, and they can be placed in almost any low earth orbit at any altitude, and they would not hurt, but strengthen system operation. For example, 10 new satellites could be piggybacked on an entirely different launch program, and just be added to the system.

Channel Assignment

The channel assignment procedure in this embodiment is as in the previous embodiment.

While the invention has been particularly shown and described with reference to preferred embodiments thereof, it will be understood by those skilled in the art that various changes in form and details may be made therein without departing from the spirit and scope of the invention.

I claim:

1. A method for making channel assignments in a satellite communications system comprising a plurality of low earth orbiting satellites, a plurality of land bases each including transmitter and receiver means operable in plurality of communication channels, and a plurality of mobile units (remotes) each having transmitter and receiver means which are selectively assigned to operate in said plurality of channels; said method being effective to make interference free channel assignments for remotes incoming into said system to communicate with selected proposed satellites without the use of central controllers, said method including the steps of:

a) making tentative channel assignments between remotes and proposed satellites based on actual signal strength;
   b) testing by a proposed satellite as to whether its transmission on a tentative channel would interfere with a transmission on a channel which a previously assigned remote is utilizing which channel may be different from said tentative channel due to Doppler shift, wherein the proposed satellite includes means for sensing Doppler effect;
   c) determining by an incoming remote being assigned to said tentative channel whether it would be interfered with by a previously assigned satellite utilizing said tentative channel;
   d) determining by said incoming remote whether it would interfere with a previously assigned satellite on the channel that the previously assigned satellite is utilizing which channel may be different from said tentative channel due to Doppler shift,
   e) determining by said proposed satellite whether it would be interfered with by a previously assigned remote, and
   dependent on the results of said tests, initiating communications.

2. A method as in claim 1 including the step of making channel assignments dependent on the Doppler shift, and making said assignments on a priority hierarchy starting from the most positive Doppler shift and moving to the most negative Doppler shift.

3. A satellite communications system comprising a plurality of low earth orbiting satellites which satellites are orbiting in paths which are random relative to each other, a plurality of land bases each including transmitter and receiver means operable in a plurality of communication channels, and a plurality of mobile units each having transmitter and receiver means which are selectively assigned to operate in said plurality of channels;

a) means for making tentative channel assignments between mobile units and proposed satellites based on signal strength;
   b) each satellite including means for sensing Doppler effect and means for testing whether its transmission on a tentative channel would interfere with a transmission on another one of said channels which a previously assigned mobile unit is utilizing, which said another one of said channels may be different from said tentative channel due to said Doppler effect.

4. A system as in claim 3 wherein, a) said bases include means for sensing Doppler shift, and each base including means for testing whether its transmission on said tentative channel would interfere with a transmission on another one of said channels which a previously assigned satellite is utilizing which said other one of said channels may be different from said tentative channel due to Doppler shift.

5. A system as in claim 3 wherein a) said mobile units include means for sensing Doppler shift, and each mobile unit includes means for testing whether its transmission on said tentative channel would interfere with a transmission on another channel which a previously assigned mobile unit is utilizing which other channel may be different from said tentative channel due to Doppler shift, and said mobile units can select the base with which said mobile units with which they will communicate.

\* \* \* \* \*